(12) United States Patent
Wu et al.

(10) Patent No.: US 12,177,781 B2
(45) Date of Patent: Dec. 24, 2024

(54) CHANNEL MONITORING METHOD, TERMINAL, AND NETWORK DEVICE

(71) Applicant: VIVO MOBILE COMMUNICATION CO., LTD., Guangdong (CN)

(72) Inventors: Kai Wu, Guangdong (CN); Xueming Pan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 447 days.

(21) Appl. No.: 17/510,796

(22) Filed: Oct. 26, 2021

(65) Prior Publication Data
US 2022/0046541 A1 Feb. 10, 2022

Related U.S. Application Data

(63) Continuation of application No. PCT/CN2020/086410, filed on Apr. 23, 2020.

(30) Foreign Application Priority Data

Apr. 26, 2019 (CN) .......................... 201910346461.7

(51) Int. Cl.
*H04B 7/185* (2006.01)
*H04W 52/02* (2009.01)
(Continued)

(52) U.S. Cl.
CPC ..... *H04W 52/0232* (2013.01); *H04W 72/044* (2013.01); *H04W 72/23* (2023.01); *H04W 72/542* (2023.01)

(58) Field of Classification Search
CPC ........... H04W 52/0232; H04W 72/044; H04W 72/23; H04W 72/542; H04W 48/12;
(Continued)

(56) References Cited

U.S. PATENT DOCUMENTS 11,177,909 B2 * 11/2021 Zhang ................... H04L 1/1896
11,228,979 B2 * 1/2022 Jose ................... H04W 52/0235
(Continued)

FOREIGN PATENT DOCUMENTS

| CN | 101965037 A | 2/2011 |
| CN | 108024340 A | 5/2018 |

(Continued)

OTHER PUBLICATIONS

Qualcomm Incorporated, Potential Techniques for UE Power Saving, 3GPP TSG-RAN WG1 #96, R1-1903016, Feb. 25-Mar. 1, 2019, Athens, Greece.
(Continued)

*Primary Examiner* — Amancio Gonzalez
(74) *Attorney, Agent, or Firm* — Price Heneveld LLP

(57) ABSTRACT

This disclosure provides a channel monitoring method, a terminal, and a network device. The channel monitoring method of this disclosure includes: obtaining a physical downlink control channel PDCCH search space configured by a network device, where the PDCCH search space indicates at least one monitoring occasion for monitoring a PDCCH; and performing PDCCH monitoring in the at least one monitoring occasion.

16 Claims, 9 Drawing Sheets

(51) Int. Cl.
*H04W 72/044* (2023.01)
*H04W 72/23* (2023.01)
*H04W 72/542* (2023.01)

(58) Field of Classification Search
CPC ............. H04W 76/28; H04W 72/0446; H04W 52/0212; H04L 5/001; H04L 5/0051; H04L 5/0057; H04L 27/0006; H04L 5/0048; H04L 5/0094; Y02D 30/70
USPC ......................................................... 370/318
See application file for complete search history.

(56) References Cited

U.S. PATENT DOCUMENTS

| | | | |
|---|---|---|---|
| 11,290,242 B2* | 3/2022 | Jung | H04W 74/006 |
| 11,470,575 B2* | 10/2022 | Agiwal | H04W 68/005 |
| 11,515,924 B2* | 11/2022 | Davydov | H04W 74/002 |
| 11,606,751 B2* | 3/2023 | Lee | H04W 76/28 |
| 11,632,196 B2* | 4/2023 | Saber | H04L 5/0055 370/329 |
| 11,778,559 B2* | 10/2023 | Maleki | H04W 52/0219 455/574 |
| 11,818,701 B2* | 11/2023 | Bagheri | H04L 5/0053 |
| 2015/0201456 A1 | 7/2015 | Lee et al. | |
| 2017/0230994 A1 | 8/2017 | You et al. | |
| 2019/0261332 A1 | 8/2019 | Li et al. | |
| 2020/0221428 A1 | 7/2020 | Moon et al. | |
| 2020/0245302 A1 | 7/2020 | Pan et al. | |
| 2021/0185652 A1* | 6/2021 | Rune | H04L 5/0053 |
| 2021/0321446 A1* | 10/2021 | Lee | H04W 72/535 |
| 2021/0368367 A1 | 11/2021 | Jiang et al. | |
| 2021/0368448 A1 | 11/2021 | Li | |
| 2022/0038207 A1* | 2/2022 | Frenne | H04L 1/0072 |
| 2022/0039009 A1* | 2/2022 | Iyer | H04L 5/0098 |
| 2022/0116875 A1* | 4/2022 | Nimbalker | H04W 52/0216 |
| 2022/0174651 A1* | 6/2022 | Seo | H04W 76/28 |
| 2023/0033126 A1* | 2/2023 | Agiwal | H04B 17/318 |

FOREIGN PATENT DOCUMENTS

| | | |
|---|---|---|
| CN | 109391971 A | 2/2019 |
| CN | 109429258 A | 3/2019 |
| CN | 109496454 A | 3/2019 |
| CN | 109842937 A | 6/2019 |
| CN | 109963326 A | 7/2019 |
| CN | 110876179 A | 3/2020 |
| EP | 3079421 A1 | 10/2016 |
| EP | 3451553 A2 | 3/2019 |
| WO | 2018082636 A1 | 5/2018 |
| WO | 2019029383 A1 | 2/2019 |
| WO | 2019031850 A1 | 2/2019 |

OTHER PUBLICATIONS

Panasonic, Discussion on PDCCH-based power saving signal/channel triggering adaptation, 3GPP TSG RAN WG1 #96bis, R1-1905185, Apr. 8-12, 2019, Xi'an, China.

VIVO, High reliability PDCCH design, 3GPP TSG RAN WG1 Meeting AH 1801, R1-1800199, Jan. 22-26, 2018, Vancouver, Canada.

Samsung, "Valid PDCCH Monitoring Occasions for Paging", 3GPP TSG-RAN2 105, R2-1900122, Athens, Greece, Feb. 25-Mar. 1, 2019.

OPPO, "Downlink signals and channels for initial access", 3GPP TSG RAN WG1 Meeting #94bis, R1-1810996, Chengdu, China, Oct. 8-12, 2018.

Huawei, "PDCCH based power saving signal/channel", 3GPP TSG RAN WG1 Meeting #96bis, R1-1903988, Xi'an, China, Apr. 8-12, 2019.

* cited by examiner

CHANNEL MONITORING METHOD, TERMINAL, AND NETWORK DEVICE

CROSS-REFERENCE TO RELATED APPLICATIONS

This application is a continuation application of PCT Application No. PCT/CN2020/086410 filed on Apr. 23, 2020, which claims priority to Chinese Patent Application No. 201910346461.7, filed in China on Apr. 26, 2019, disclosures of which are incorporated herein by reference in their entireties.

TECHNICAL FIELD

This disclosure relates to the field of communications application technologies, and in particular, to a channel monitoring method, a terminal, and a network device.

BACKGROUND

For each discontinuous reception (DRX) cycle in an idle state or a radio resource control (RRC) connected state, before the DRX cycle, a base station first transmits a wake-up signal to user equipment (UE), and the UE wakes at a corresponding time to check the wake-up signal. If the UE detects the wake-up signal, the UE performs physical downlink control channel (PDCCH) monitoring during a DRX active period; otherwise, the UE may not perform PDCCH monitoring during the DRX active period, that is, skips the DRX and continues to sleep.

A network side may explicitly notify the UE to wake and perform reception in a DRX cycle, or skip the DRX. In other words, no matter whether the UE needs to be woken up, the network side always needs to transmit a PDCCH for a corresponding indication, which means relatively large system overheads.

Alternatively, the network side transmits a PDCCH used for a wake-up signal only when the UE needs to be woken up. If the UE does not need to perform monitoring in a next DRX cycle, the network may not transmit any PDCCH, thereby reducing network overheads. In this case, if the UE fails to receive the wake-up signal, the UE may miss monitoring in a subsequent DRX cycle, which may lead to large data transmission delay. Therefore, it is necessary to consider enhancing PDCCH transmission and UE monitoring to ensure the transmission performance of the wake-up signal.

It can be learned from the foregoing descriptions that in a case that the DRX and the wake-up signal are configured, if the UE fails to receive the PDCCH used for transmitting the wake-up signal, traffic transmission is greatly affected. Therefore, PDCCH transmission needs to be enhanced to ensure reception performance of a terminal in receiving the PDCCH based wake-up signal.

SUMMARY

According to a first aspect, an embodiment of this disclosure provides a channel monitoring method, applied to a terminal and including:
 obtaining a physical downlink control channel PDCCH search space configured by a network device, where the PDCCH search space indicates at least one monitoring occasion for monitoring a PDCCH; and
 performing PDCCH monitoring in the at least one monitoring occasion.

According to a second aspect, an embodiment of this disclosure further provides a channel monitoring method, applied to a network device and including:
 configuring a physical downlink control channel PDCCH search space, where the PDCCH search space indicates at least one monitoring occasion for monitoring a PDCCH.

According to a third aspect, an embodiment of this disclosure further provides a terminal, including a memory, a processor, and a computer program stored in the memory and capable of running on the processor, where when the computer program is executed by the processor, the steps of the foregoing channel monitoring method applied to a terminal side are implemented.

According to a fourth aspect, an embodiment of this disclosure further provides a network device, including:
 a configuration module, configured to configure a physical downlink control channel PDCCH search space, where the PDCCH search space indicates at least one monitoring occasion for monitoring a PDCCH.

According to a fifth aspect, an embodiment of this disclosure further provides a network device, including a memory, a processor, and a computer program stored in the memory and capable of running on the processor, where when the computer program is executed by the processor, the steps of the foregoing channel monitoring method applied to a network device side are implemented.

According to a sixth aspect, an embodiment of this disclosure further provides a computer-readable storage medium, where the computer-readable storage medium stores a computer program, and when the computer program is executed by a processor, the steps of the foregoing channel monitoring method applied to a terminal or a network device side are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may derive other drawings from these accompanying drawings without creative efforts.

DETAILED DESCRIPTION

The following describes example embodiments of this disclosure in more detail with reference to the accompanying drawings. Although the example embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure and completely convey the scope of this disclosure to a person skilled in the art.

The terms "first", "second", and the like in this specification and claims of this application are used to distinguish between similar objects instead of describing a specific order or sequence. It should be understood that the data used in this way is interchangeable in appropriate circumstances, so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. "And/or" in the specification and claims represents at least one of connected objects.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Figure 1:
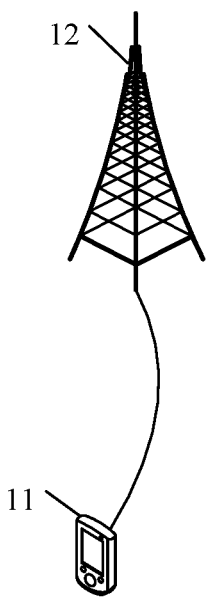
FIG. 1 is a structural diagram of a network system to which an embodiment of this disclosure may be applied.

FIG. 1 is a block diagram of a wireless communications system to which an embodiment of this disclosure may be applied. The wireless communications system includes a terminal 11 and a network device 12. The terminal 11 may also be referred to as a terminal device or user equipment (UE). The terminal 11 may be a terminal side device such as a mobile phone, a tablet computer (Tablet Personal Computer), a laptop computer, a personal digital assistant (PDA), a mobile internet device (MID), a wearable device, or an in-vehicle device. It should be noted that the terminal 11 is not limited to any specific type in the embodiments of this disclosure. The network device 12 may be a base station or a core network, where the base station may be a base station of 5G or a later version (for example, gNB or 5G NR NB), or a base station in other communications systems (for example, an eNB, a WLAN access point, or another access points). The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a Wi-Fi node, or some other appropriate term in the art. As long as the same technical effects are achieved, the base station is not limited to a specific technical term. It should be noted that the base station in the NR system is taken only as an example in the embodiments of this disclosure, but a specific type of the base station is not limited.

Figure 2:
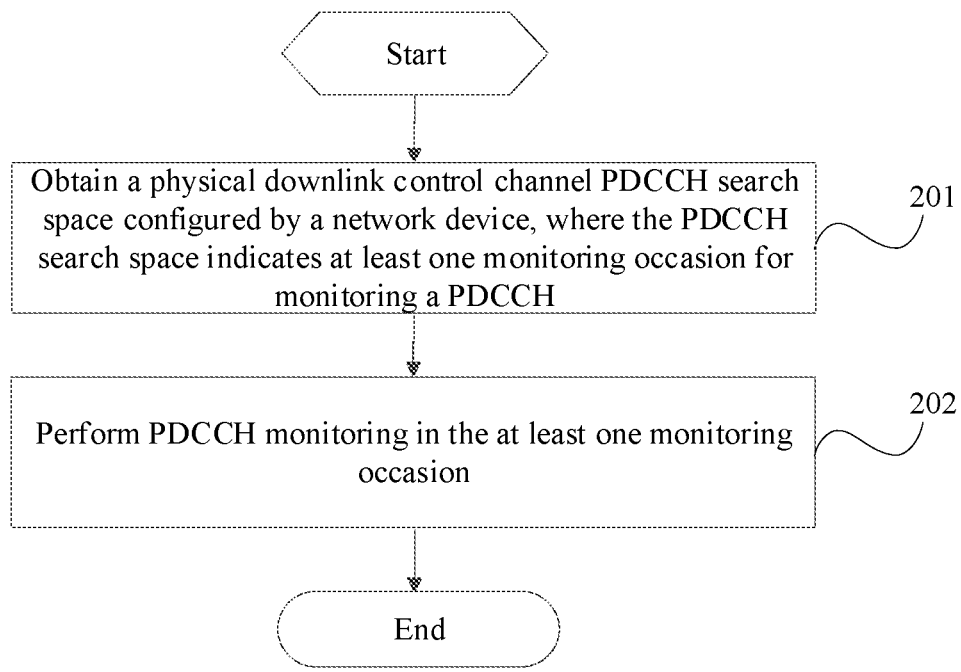
FIG. 2 is a first schematic flowchart of a channel monitoring method according to an embodiment of this disclosure.

As shown in FIG. 2, an embodiment of this disclosure provides a channel monitoring method, applied to a terminal. The method includes the following steps.

Step 201. Obtain a physical downlink control channel PDCCH search space configured by a network device, where the PDCCH search space indicates at least one monitoring occasion for monitoring a PDCCH.

In this embodiment of this disclosure, the PDCCH search space may be obtained by using radio resource control RRC signaling, where the PDCCH search space may be specifically used to indicate at least one of a monitoring occasion periodicity, monitoring duration in each periodicity, a monitoring start time in each periodicity, or a monitoring start OFDM symbol in a predetermined period of time (for example, one slot).

Step 202. Perform PDCCH monitoring in the at least one monitoring occasion.

Information transmitted in a PDCCH is used to indicate at least one of the following:
  whether the terminal needs to perform PDCCH monitoring during a target discontinuous reception DRX cycle, where the duration of the target DRX cycle is duration of a current DRX cycle, or duration of consecutive Q DRX cycles after current time, where Q is a positive integer;
  that the terminal performs bandwidth part BWP switching;
  that the terminal activates or deactivates an object, where the object is at least one of a cell, a cell group, a carrier, or a carrier group;
  that the terminal stops PDCCH monitoring in a preset period of time;
  that the terminal performs receive antenna switching;
  a slot structure for the terminal;
  that the terminal triggers reporting of channel state information CSI;
  that the terminal triggers transmitting of a sounding reference signal SRS;
  that the terminal receives a tracking reference signal TRS;
  that the terminal receives a CSI-RS;
  a physical downlink shared channel PDSCH time-domain resource allocation configuration for the terminal, for example, whether to use cross slot scheduling;
  that the terminal performs at least one of beam management BM measurement, radio link monitoring RLM measurement, or radio resource management RRM measurement;
  at least one of a total time of channel occupation time COT, a remaining time of COT, or channel access priority of the terminal in a new radio unlicensed band NR-U;
  a power control parameter for uplink physical channel transmission by the terminal and/or a power control parameter for uplink physical signal transmission by the terminal;
  that the terminal activates a different DRX configuration or downlink control channel search space configuration; or a maximum number of layers for PDSCH reception by the terminal.

In the channel monitoring method in this embodiment of this disclosure, a physical downlink control channel PDCCH search space configured by a network device is obtained, where the PDCCH search space indicates at least one monitoring occasion for monitoring a PDCCH; and PDCCH monitoring is performed in the at least one monitoring occasion. In the embodiments of this disclosure, flexibility of PDCCH transmission by the network device can be ensured, and furthermore, the terminal can perform monitoring at least once in the PDCCH search space, thereby effectively ensuring the reception performance of the terminal in receiving the PDCCH.

Further, the performing PDCCH monitoring in the at least one monitoring occasion includes:

performing PDCCH monitoring in a valid monitoring occasion of the at least one monitoring occasion, where the valid monitoring occasion meets at least one of the following criteria:

an orthogonal frequency division multiplexing OFDM symbol in which the valid monitoring occasion is located is a symbol other than an uplink symbol and/or a flexible symbol indicated by higher layer signaling;

an OFDM symbol in which the valid monitoring occasion is located is a symbol other than an uplink symbol and/or flexible symbol indicated by downlink control information DCI;

an OFDM symbol in which the valid monitoring occasion is located is a symbol other than a symbol for synchronization signal block SSB measurement or channel state information-reference signal CSI-RS measurement; or an OFDM symbol in which the valid monitoring occasion is located is a symbol adjacent to a symbol for SSB measurement or adjacent to a symbol for CSI-RS measurement.

Further, the valid monitoring occasion is indicated by the network device;

or in a case that there are at least two valid monitoring occasions, the at least two valid monitoring occasions are consecutive monitoring occasions in the PDCCH search space;

or the valid monitoring occasion is one monitoring occasion starting at a monitoring start time or multiple consecutive monitoring occasions starting at a monitoring start time. The monitoring start time may be indicated by a network. For example, the network indicates a time offset of the monitoring start time relative to a start slot of discontinuous reception on-duration DRX Onduration.

Figure 3:
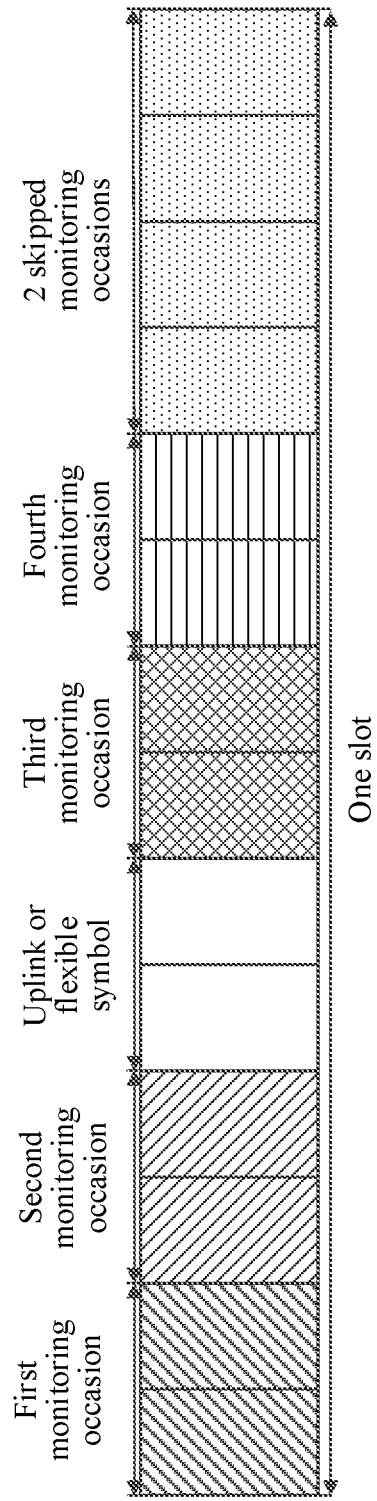
FIG. 3 is a schematic diagram of monitoring occasions according to an embodiment of this disclosure.

As shown in FIG. 3, assuming that a PDCCH search space configured by a network device includes 6 monitoring occasions, the terminal may perform monitoring on 4 monitoring occasions in the PDCCH search space, and the 4 monitoring occasions may be 4 monitoring occasions starting from the monitoring start time or 4 monitoring occasions indicated by the network device. For example, the terminal may monitor the first 4 monitoring occasions starting from the monitoring start time, and abandon monitoring in remaining 2 monitoring occasions.

Further, the performing PDCCH monitoring in the at least one monitoring occasion includes:

performing PDCCH monitoring in the first M PDCCH candidates corresponding to an aggregation level of the at least one monitoring occasion, where M is a positive integer.

In this embodiment of this disclosure, the PDCCH candidates may include 1, 2, 4, 8 or 16 control channel elements CCE, and for different aggregation levels, corresponding values of M may be different.

For example, the terminal needs to monitor PDCCHs with aggregation levels 4 and 8. For PDCCHs with aggregation level 4, only the first 4 PDCCH candidates may be monitored, and for PDCCHs with aggregation level 8, only the first 2 PDCCH candidates may be monitored.

Further, the performing PDCCH monitoring in the at least one monitoring occasion includes:

performing PDCCH monitoring in time locations of N PDCCH candidates in the at least one monitoring occasion indicated by the network device, where N is a positive integer. For example, a search space configured by a network has 8 time locations for PDCCH monitoring during a period of duration in each periodicity, and the network may further indicate that monitoring can be performed only in 6 of these 8 time locations. In this embodiment of this disclosure, time locations of PDCCH candidates to be monitored may be indicated directly by the network device, to help the terminal to perform monitoring.

Further, the performing PDCCH monitoring in the at least one monitoring occasion includes:

receiving a PDCCH by applying a same quasi co-location QCL assumption on the at least one monitoring occasion.

Herein, the PDCCH includes a PDCCH demodulation reference signal.

The QCL assumption applied on the at least one monitoring occasion is determined in at least one of the following manners:

using a QCL assumption of control resource set CORESET #0;

using a QCL assumption with a same activated transmission configuration indication TCI state as CORESET0;

using an SSB or CSI-RS selected in a latest random access procedure;

using an activated TCI state corresponding to a CORESET with the smallest or largest index in CORESETs that are configured on an activated bandwidth part BWP;

using an activated TCI state corresponding to a CORESET indicated by a network in CORESETs that are configured on an activated BWP; or using an activated TCI state corresponding to a CORESET that corresponds to a target search space in search spaces that are currently being monitored, the target search space being a search space with a shortest or longest monitoring slot periodicity in all search spaces that are currently being monitored, where the CORESETs that are configured on the activated BWP are CORESETs other than a CORESET in which the PDCCH is transmitted. The CORESETs that are configured on the activated BWP and the CORESET in which the PDCCH is transmitted may be on a same BWP, or may be on different BWPs. In a specific embodiment of this disclosure, 4 BWPs may be configured for each UE by using higher layer signaling, and up to 3 CORESETs can be configured on each BWP. Each CORESET may be configured with one or more TCI states by using RRC. If there are a plurality of configured TCI states, the network activates one TCI state through a media access control control element (MAC-CE).

For CORESET0, the UE assumes that a demodulation reference signal DMRS received in a PDCCH in the CORESET is quasi co-located (QCL) with the following signal:

one or more downlink reference signals (RS) indicated by a TCI state, where the TCI state of the CORESET is indicated by a MAC-CE activation command.

If after a latest random access procedure, the UE has not received the MAC-CE command for activating the TCI state of CORESET0, the demodulation reference signal is quasi co-located with an SSB identified by the UE during the latest random access procedure. The random access procedure is not a contention free random access procedure triggered by a PDCCH command.

For a CORESET whose index is not 0, if only one CORESET is configured by using higher layer signaling, or if the UE receives a MAC-CE activation command indicating one of a plurality of TCI states in the CORESET configured by using the higher layer signaling, the UE assumes that the demodulation reference signal (DMRS) received by the PDCCH in the CORESET is quasi co-located with one or more downlink RSs indicated by the TCI state.

For a CORESET whose index is 0, the UE assumes that the MAC-CE activation command indicates an RS as a CSI-RS, and the CSI-RS and the SSB are quasi co-located with QCL typeD.

If a MAC-CE activation command received by the UE indicates to activate one of a plurality of TCI states, the UE uses this activated TCI state to perform reception 3 ms after feeding back a hybrid automatic repeat request acknowledgment (HARQ-ACK) corresponding to a physical downlink shared channel (PDSCH) for transmission of the MAC-CE.

In a specific embodiment of this disclosure, for a PDCCH used to transmit a wake-up signal, the network may configure a BWP with a narrow bandwidth, and configure a CORESET on the BWP for reception of the PDCCH, or the network directly configures a CORESET with a narrow bandwidth for reception of the PDCCH in the CORESET.

When the UE receives the PDCCH in the CORESET, a same TCI state is used for the PDCCH, and the following receiving manners are included:

If in addition to monitoring the CORESET of the PDCCH, the UE only needs to monitor CORESET0, the activated TCI-state of CORESET0 is used for receiving; and/or an associated SSB or CSI-RS selected during a latest random access RACH procedure is used for receiving; and if in addition to monitoring the CORESET of the PDCCH and CORESET0, the UE needs to monitor other CORESETs, an activated TCI state corresponding to a CORESET with the smallest or largest index in other activated CORESETs or a CORESET indicated by the network is used for receiving, and/or an activated TCI state of a CORESET corresponding to a search space with the shortest or longest monitoring slot periodicity in search spaces that are currently being monitored is used for receiving.

Further, the performing PDCCH monitoring in the at least one monitoring occasion includes:

receiving a PDCCH by applying different QCL assumptions in different monitoring occasions.

Herein, the PDCCH includes a PDCCH demodulation reference signal.

The QCL assumption is determined in at least one of the following manners:

using at least one TCI state corresponding to a CORESET in which the PDCCH indicated by the network device is located;

using a TCI state corresponding to a CORESET other than a CORESET in which the PDCCH is located;

using a mapping between monitoring occasions and TCI state identifiers IDs;

using a mapping between monitoring occasions and CORESET IDs;

using a mapping between monitoring occasions and CSI-RS resource indexes; or using a mapping between monitoring occasions and SSB resource indexes.

In a specific embodiment of this disclosure, for a PDCCH used to transmit a wake-up signal, the network may configure a BWP with a narrow bandwidth, and configure a CORESET on the BWP for reception of the PDCCH, or the network directly configures a CORESET with a narrow bandwidth for reception of the PDCCH in the CORESET.

Figure 4:
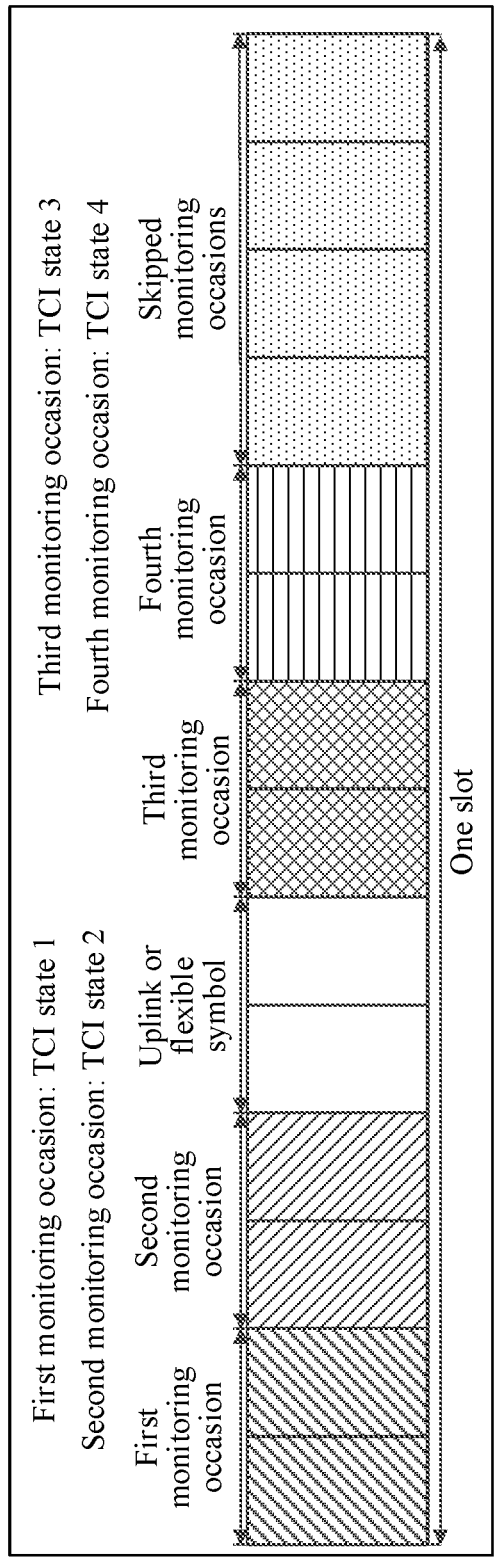
FIG. 4 is a first schematic diagram of monitoring occasions and corresponding TCI states according to an embodiment of this disclosure.

The network may not configure a TCI state for the CORESET. When the UE performs reception of the PDCCH in the CORESET, a different TCI state is used for the PDCCH, and at least one of the following receiving manners is included:

that the network indicates a plurality of TCI states corresponding to CORESETs in which these WUS PDCCHs are located, for example, the network indicates to use X different TCI states for reception of the PDCCH. As shown in FIG. 4, it is indicated that the first monitoring occasion corresponds to TCI state 1, the second monitoring occasion corresponds to TCI state 2, the third monitoring occasion corresponds to TCI state 3, and the fourth monitoring occasion corresponds to TCI state 4.

Figure 5:
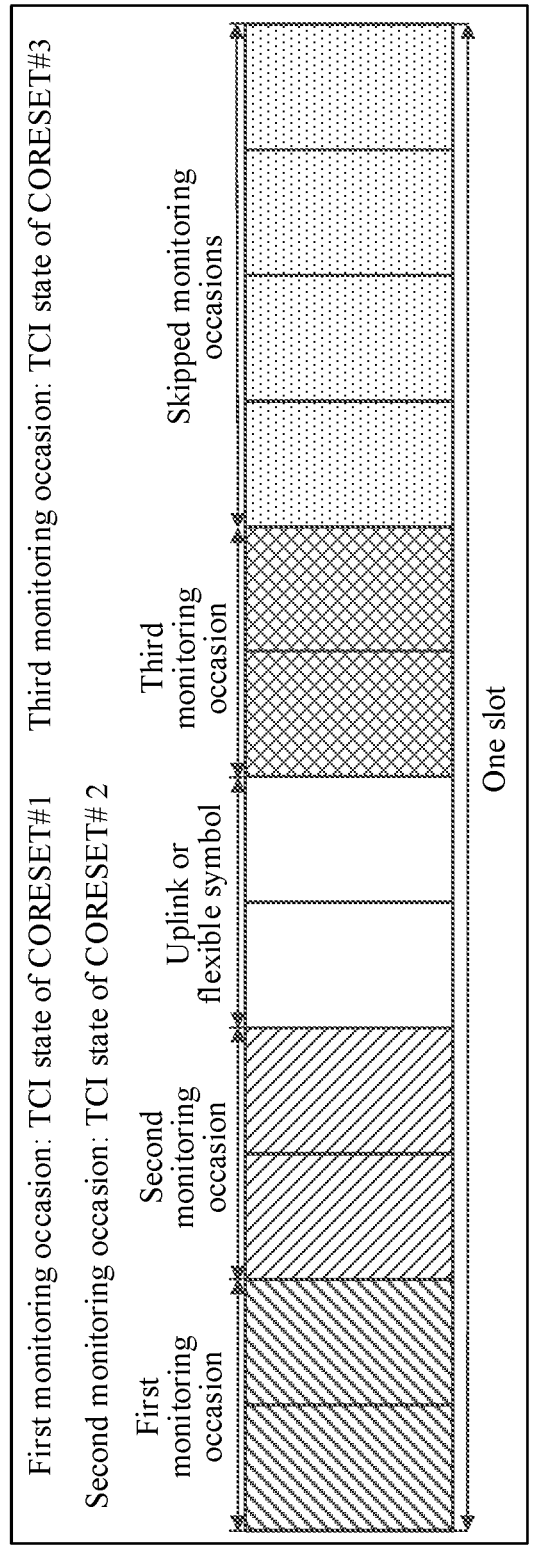
FIG. 5 is a second schematic diagram of monitoring occasions and corresponding TCI states according to an embodiment of this disclosure.

The UE uses TCI states of all other activated CORESETs for monitoring except the CORESET in which the WUS is located. For example, in addition to the CORESET with the WUS, there are 3 activated CORESETs, so the UE uses different TCI states of these 3 activated CORESETs for reception of the PDCCH. These 3 CORESETs and the CORESET for WUS PDCCH monitoring may be on a same BWP, or may be on different BWPs. As shown in FIG. 5, the first monitoring occasion corresponds to a TCI state of CORESET #1, the second monitoring occasion corresponds to a TCI state of CORESET #2, and the third monitoring occasion corresponds to a TCI state of CORESET #3.

Figure 6:
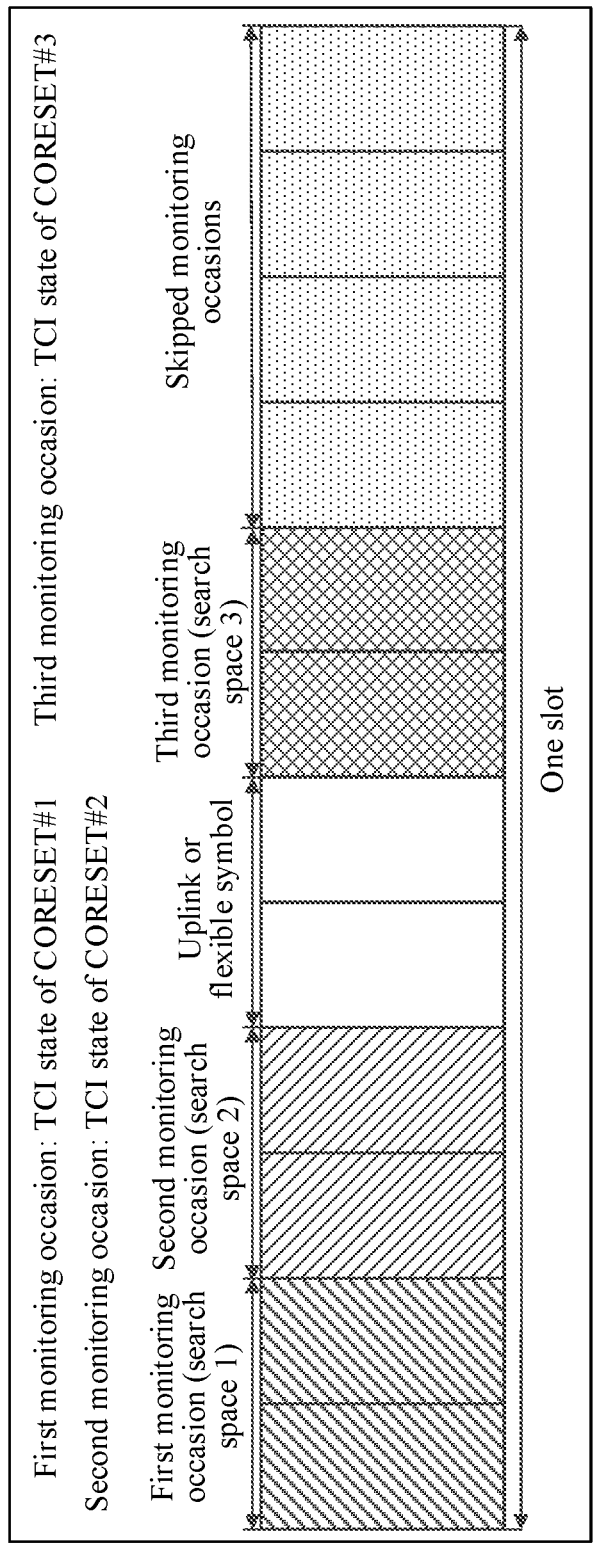
FIG. 6 is a third schematic diagram of monitoring occasions and corresponding TCI states according to an embodiment of this disclosure.

In addition, the monitoring occasions shown in FIG. 5 are in a same search space, and certainly, monitoring occasions in this embodiment of this disclosure may alternatively be in different search spaces. As shown in FIG. 6, the first monitoring occasion is a monitoring occasion in search space 1, the second monitoring occasion is a monitoring occasion in search space 2, the third monitoring occasion is a monitoring occasion in search space 3, the first monitoring occasion corresponds to a TCI state of CORESET #1, the second monitoring occasion corresponds to a TCI state of CORESET #2, and the third monitoring occasion corresponds to a TCI state of CORESET #3.

In a specific case of monitoring, the UE may use different TCI states for monitoring in a plurality of different monitoring occasions. For example, a chronological order of monitoring occasions is in one-to-one correspondence to an order of CORESET IDs or TCI state IDs (or CSI-RS/SSB resource indexes). For example, if the UE needs to perform monitoring in 3 monitoring occasions, and CORESET #1,

2, and #3 are currently activated CORESETs, TCI states corresponding to CORESET #1, #2, and #3 are used respectively for monitoring in these 3 monitoring occasions.

In frequency range 2 (FR2), frequencies are relatively high with relatively short wavelength. A relatively narrow beam can be formed by using an antenna array with a relatively close spacing, and a relatively narrow beam formed through transmit beam forming is used for transmission in a network. The UE may perform receive beam forming through a receive antenna array to improve transmission performance. UE may be configured with up to 3 CORESETs for monitoring on an activated BWP, and each CORESET may have a different TCI state, that is, each CORESET may use a different receive beam for receiving. In a case of DRX configured by the network, because the UE does not perform beam tracking and adjustment during a DRX inactive period, receive beams corresponding to TCI states that correspond to CORESETs configured and activated by the network may not have good performance. If only one of the CORESETs is monitored, that is, only one of the receive beams is used for receiving, reception performance may not be ensured in a case of changing channel conditions. While in the channel monitoring method according to an embodiment of this disclosure, by configuring the terminal to monitor in a plurality of monitoring occasions, the network can gain flexibility of transmitting control channels, and the UE can implement monitoring for many times on a same beam or different beams in a plurality of monitoring occasions, achieving better reception performance. In addition, the embodiments of this disclosure can ensure that the terminal completes PDCCH monitoring in a short time, which is beneficial to reducing power consumption of the terminal.

Figure 7:
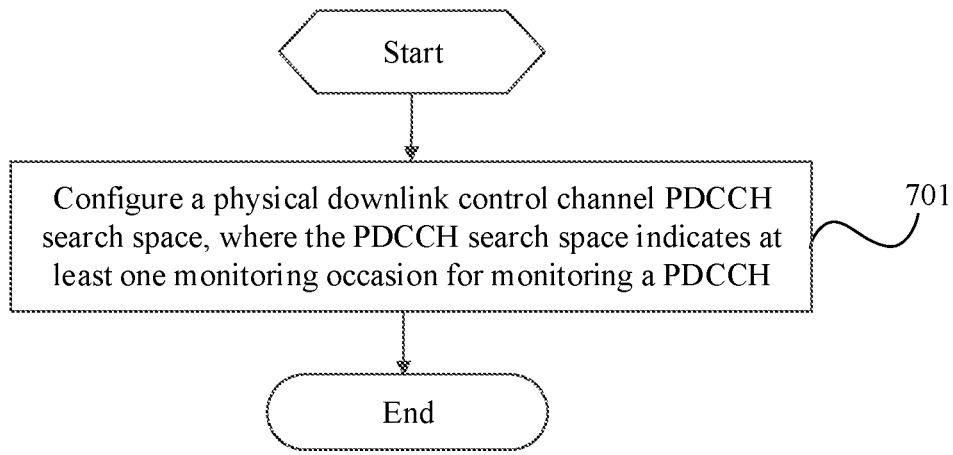
FIG. 7 is a second schematic flowchart of a channel monitoring method according to an embodiment of this disclosure.

As shown in FIG. 7, an embodiment of this disclosure further provides a channel monitoring method, applied to a network device. The method includes:

Step 701. Configure a physical downlink control channel PDCCH search space, where the PDCCH search space indicates at least one monitoring occasion for monitoring a PDCCH.

In this embodiment of this disclosure, after configuring the PDCCH search space, the network device indicates to a terminal the configured PDCCH search space by using RRC signaling.

The PDCCH search space may be specifically used to indicate at least one of a monitoring occasion periodicity, monitoring duration in each periodicity, a monitoring start time in each periodicity, or a monitoring start OFDM symbol in a predetermined period of time (for example, one slot slot).

In the channel monitoring method in this embodiment of this disclosure, a physical downlink control channel PDCCH search space is configured, where the PDCCH search space indicates at least one monitoring occasion for monitoring a PDCCH, so that the terminal performs monitoring at least once in the PDCCH search space, thereby effectively ensuring the reception performance of the terminal in receiving the PDCCH, and flexibility of PDCCH transmission by the network device can be ensured.

Further, after the configuring a physical downlink control channel PDCCH search space, the method further includes:
indicating, to a terminal, a valid monitoring occasion, where the valid monitoring occasion is a monitoring occasion in which the terminal performs PDCCH monitoring.

Alternatively, if no valid monitoring occasion is indicated by the network, the valid monitoring occasion meets at least one of the following criteria:
an orthogonal frequency division multiplexing OFDM symbol in which the valid monitoring occasion is located is a symbol other than an uplink symbol and/or a flexible symbol indicated by higher layer signaling;
an OFDM symbol in which the valid monitoring occasion is located is a symbol other than an uplink symbol and/or flexible symbol indicated by downlink control information DCI;
an OFDM symbol in which the valid monitoring occasion is located is a symbol other than a symbol for synchronization signal block SSB measurement or channel state information-reference signal CSI-RS measurement; or
an OFDM symbol in which the valid monitoring occasion is located is a symbol adjacent to a symbol for SSB measurement or adjacent to a symbol for CSI-RS measurement.

In a specific embodiment of this disclosure, in a case that there are at least two valid monitoring occasions, the at least two valid monitoring occasions are consecutive monitoring occasions in the PDCCH search space;
or the valid monitoring occasion is one monitoring occasion starting at a monitoring start time or multiple consecutive monitoring occasions starting at a monitoring start time.

Further, after the configuring a physical downlink control channel PDCCH search space, the method further includes:
indicating, to a terminal, the number of PDCCH candidates corresponding to each monitoring aggregation level.

In this embodiment of this disclosure, the PDCCH candidates may include 1, 2, 4, 8 or 16 control channel elements CCE, and for different aggregation levels, corresponding values of M may be different.

For example, the terminal needs to monitor PDCCHs with aggregation levels 4 and 8. For PDCCHs with aggregation level 4, only the first 4 PDCCH candidates may be monitored, and for PDCCHs with aggregation level 8, only the first 2 PDCCH candidates may be monitored.

Further, after the configuring a physical downlink control channel PDCCH search space, the method further includes:
indicating, to a terminal, time locations of N PDCCH candidates for PDCCH monitoring in the at least one monitoring occasion, where N is a positive integer.

In this embodiment of this disclosure, time locations of PDCCH candidates to be monitored may be indicated directly by the network device, to help the terminal to perform monitoring.

In the channel monitoring method in this embodiment of this disclosure, a physical downlink control channel PDCCH search space is configured, where the PDCCH search space indicates at least one monitoring occasion for monitoring a PDCCH, so that the terminal performs monitoring at least once in the PDCCH search space, thereby effectively ensuring the reception performance of the terminal in receiving the PDCCH, and flexibility of PDCCH transmission by the network device can be ensured.

Figure 8:
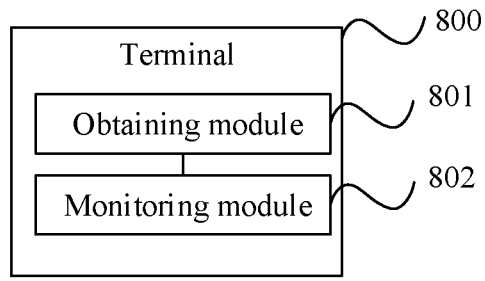
FIG. 8 is a schematic modular diagram of a terminal according to an embodiment of this disclosure.

FIG. 8 is a schematic modular diagram of a terminal according to an embodiment of this disclosure. As shown in FIG. 8, an embodiment of this disclosure further provides a terminal 800, including:
an obtaining module 801, configured to obtain a physical downlink control channel PDCCH search space configured by a network device, where the PDCCH search space indicates at least one monitoring occasion for monitoring a PDCCH; and a monitoring module 802, configured to perform PDCCH monitoring in the at least one monitoring occasion.

In the terminal in this embodiment of this disclosure, the monitoring module 802 is configured to perform PDCCH monitoring in a valid monitoring occasion of the at least one monitoring occasion, where the valid monitoring occasion meets at least one of the following criteria:

an orthogonal frequency division multiplexing OFDM symbol in which the valid monitoring occasion is located is a symbol other than an uplink symbol and/or flexible symbol indicated by higher layer signaling;

an OFDM symbol in which the valid monitoring occasion is located is a symbol other than an uplink symbol and/or flexible symbol indicated by downlink control information DCI;

an OFDM symbol in which the valid monitoring occasion is located is a symbol other than a symbol for synchronization signal block SSB measurement or channel state information-reference signal CSI-RS measurement; or an OFDM symbol in which the valid monitoring occasion is located is a symbol adjacent to a symbol for SSB measurement or adjacent to a symbol for CSI-RS measurement.

In the terminal in this embodiment of this disclosure, the valid monitoring occasion is indicated by the network device;

or in a case that there are at least two valid monitoring occasions, the at least two valid monitoring occasions are consecutive monitoring occasions in the PDCCH search space;

or the valid monitoring occasion is one monitoring occasion starting at a monitoring start time or multiple consecutive monitoring occasions starting at a monitoring start time.

In the terminal in this embodiment of this disclosure, the monitoring module 802 is configured to perform PDCCH monitoring in the first M PDCCH candidates corresponding to an aggregation level of the at least one monitoring occasion, where M is a positive integer.

In the terminal in this embodiment of this disclosure, the monitoring module 802 is configured to perform PDCCH monitoring in time locations of N PDCCH candidates in the at least one monitoring occasion indicated by the network device, where N is a positive integer.

In the terminal in this embodiment of this disclosure, the monitoring module 802 is configured to receive a PDCCH by applying a same quasi co-location QCL assumption on the at least one monitoring occasion.

The terminal in this embodiment of this disclosure further includes:

a first determining module, configured to determine the QCL assumption in at least one of the following manners:

using a QCL assumption of control resource set CORESET0;

using a QCL assumption with a same activated transmission configuration indication TCI state as CORESET0;

using an SSB or CSI-RS selected in a latest random access procedure;

using an activated TCI state corresponding to a CORESET with the smallest or largest index in CORESETs that are configured on an activated bandwidth part BWP;

using an activated TCI state corresponding to a CORESET indicated by a network in CORESETs that are configured on an activated BWP; or using an activated TCI state corresponding to a CORESET that corresponds to a target search space in search spaces that are currently being monitored, the target search space being a search space with a shortest or longest monitoring slot periodicity in all search spaces that are currently being monitored, where the CORESETs that are configured on the activated BWP are CORESETs other than a CORESET in which the PDCCH is transmitted.

In the terminal in this embodiment of this disclosure, the monitoring module 802 is configured to receive a PDCCH by applying different QCL assumptions in different monitoring occasions.

The terminal in this embodiment of this disclosure further includes:

a second determining module, configured to determine the QCL assumption in at least one of the following manners:

using at least one TCI state corresponding to a CORESET in which the PDCCH indicated by the network device is located;

using a TCI state corresponding to a CORESET other than a CORESET in which the PDCCH is located;

using a mapping between monitoring occasions and TCI state identifiers IDs;

using a mapping between monitoring occasions and CORESET IDs;

using a mapping between monitoring occasions and CSI-RS resource indexes; or using a mapping between monitoring occasions and SSB resource indexes.

In the terminal in this embodiment of this disclosure, information transmitted in a PDCCH is used to indicate at least one of the following:

whether the terminal needs to perform PDCCH monitoring during a target discontinuous reception DRX cycle, where the duration of the target DRX cycle is duration of a current DRX cycle, or duration of consecutive Q DRX cycles after current time, where Q is a positive integer;

that the terminal performs bandwidth part BWP switching;

that the terminal activates or deactivates an object, where the object is at least one of a cell, a cell group, a carrier, or a carrier group;

that the terminal stops PDCCH monitoring in a preset period of time;

that the terminal performs receive antenna switching;

a slot structure for the terminal;

that the terminal triggers reporting of channel state information CSI;

that the terminal triggers transmitting of a sounding reference signal SRS;

that the terminal receives a tracking reference signal TRS;

that the terminal receives a CSI-RS;

a physical downlink shared channel PDSCH time-domain resource allocation configuration for the terminal;

that the terminal performs at least one of beam management BM measurement, radio link monitoring RLM measurement, or radio resource management RRM measurement;

at least one of a total time of channel occupation time COT, a remaining time of COT, or channel access priority of the terminal in a new radio unlicensed band NR-U;

a power control parameter for uplink physical channel transmission by the terminal and/or a power control parameter for uplink physical signal transmission by the terminal;

that the terminal activates a different DRX configuration or downlink control channel search space configuration; or a maximum number of layers for PDSCH reception by the terminal.

In the terminal in this embodiment of this disclosure, a physical downlink control channel PDCCH search space configured by a network device is obtained, where the PDCCH search space indicates at least one monitoring occasion for monitoring a PDCCH; and PDCCH monitoring is performed in the at least one monitoring occasion. In the embodiments of this disclosure, flexibility of PDCCH transmission by the network device can be ensured, and furthermore, the terminal can perform monitoring at least once in the PDCCH search space, thereby effectively ensuring the reception performance of the terminal in receiving the PDCCH.

An embodiment of this disclosure further provides a terminal, including a memory, a processor, and a computer program stored in the memory and capable of running on the processor, where when the computer program is executed by the processor, the processes in the foregoing channel monitoring method embodiment applied to the terminal are implemented, with the same technical effects achieved. To avoid repetition, details are not described again herein.

An embodiment of this disclosure further provides a computer-readable storage medium, where a computer program is stored in the computer-readable storage medium, and when the computer program is executed by a processor, the processes in the foregoing channel monitoring method embodiment applied to the terminal are implemented, with the same technical effects achieved. To avoid repetition, details are not described again herein. For example, the computer-readable storage medium is a read-only memory (ROM), a random access memory (RAM), a magnetic disk, or an optical disk.

Figure 9:
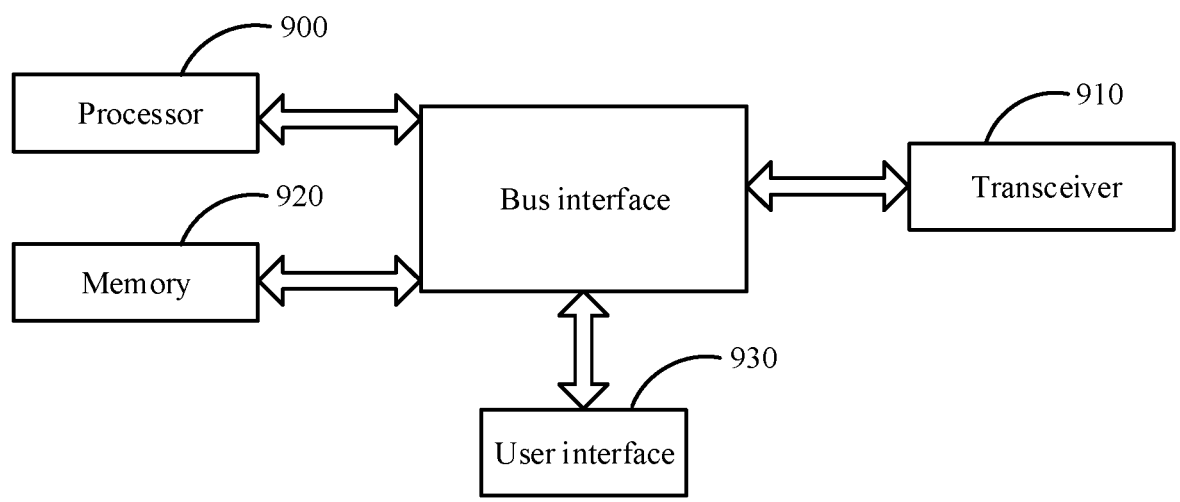
FIG. 9 is a first structural block diagram of a terminal according to an embodiment of this disclosure.

To better achieve the foregoing objective, as shown in FIG. 9, an embodiment of this disclosure further provides a terminal, including a memory 920, a processor 900, a transceiver 910, a user interface 930, a bus interface, and a computer program that is stored in the memory 920 and capable of running on the processor 900, where the processor 900 is configured to read the program in the memory 920 to perform the following process:

obtaining a physical downlink control channel PDCCH search space configured by a network device, where the PDCCH search space indicates at least one monitoring occasion for monitoring a PDCCH; and performing PDCCH monitoring in the at least one monitoring occasion.

In FIG. 9, a bus architecture may include any quantity of interconnected buses and bridges, and specifically connect together various circuits of one or more processors represented by the processor 900 and a memory represented by the memory 920. The bus architecture may further interconnect various other circuits such as a peripheral device, a voltage regulator, and a power management circuit. These are all well known in the art, and therefore are not further described in this specification. The bus interface provides interfaces. The transceiver 910 may be a plurality of components, that is, the transceiver 910 includes a transmitter and a receiver, and provides a unit for communicating with various other apparatuses on a transmission medium. For different user equipment, the user interface 930 may also be an interface for externally or internally connecting a required device, and the connected device includes but is not limited to a keypad, a display, a speaker, a microphone, a joystick, or the like.

The processor 900 is responsible for management of the bus architecture and general processing, and the memory 920 may store data used by the processor 900 when the processor 900 performs an operation.

Optionally, by reading the program in the memory 920, the processor 900 is further configured to perform the following:

performing PDCCH monitoring in a valid monitoring occasion of the at least one monitoring occasion, where the valid monitoring occasion meets at least one of the following criteria:

an orthogonal frequency division multiplexing OFDM symbol in which the valid monitoring occasion is located is a symbol other than an uplink symbol and/or flexible symbol indicated by higher layer signaling;

an OFDM symbol in which the valid monitoring occasion is located is a symbol other than an uplink symbol and/or flexible symbol indicated by downlink control information DCI;

an OFDM symbol in which the valid monitoring occasion is located is a symbol other than a symbol for synchronization signal block SSB measurement or channel state information-reference signal CSI-RS measurement; or an OFDM symbol in which the valid monitoring occasion is located is a symbol adjacent to a symbol for SSB measurement or adjacent to a symbol for CSI-RS measurement.

Optionally, the valid monitoring occasion is indicated by the network device;

or in a case that there are at least two valid monitoring occasions, the at least two valid monitoring occasions are consecutive monitoring occasions in the PDCCH search space;

or the valid monitoring occasion is one monitoring occasion starting at a monitoring start time or multiple consecutive monitoring occasions starting at a monitoring start time.

Optionally, by reading the program in the memory 920, the processor 900 is further configured to perform the following:

performing PDCCH monitoring in the first M PDCCH candidates corresponding to an aggregation level of the at least one monitoring occasion, where M is a positive integer.

Optionally, by reading the program in the memory 920, the processor 900 is further configured to perform the following:

performing PDCCH monitoring in time locations of N PDCCH candidates in the at least one monitoring occasion indicated by the network device, where N is a positive integer.

Optionally, by reading the program in the memory 920, the processor 900 is further configured to perform the following:

receiving a PDCCH by applying a same quasi co-location QCL assumption on the at least one monitoring occasion.

Optionally, the QCL assumption is determined in at least one of the following manners:

using a QCL assumption of control resource set CORESET0;

using a QCL assumption with a same activated transmission configuration indication TCI state as CORESET0;

using an SSB or CSI-RS selected in a latest random access procedure;

using an activated TCI state corresponding to a CORESET with the smallest or largest index in CORESETs that are configured on an activated bandwidth part BWP;

using an activated TCI state corresponding to a CORESET indicated by a network in CORESETs that are configured on an activated BWP; or using an activated TCI state corresponding to a CORESET that corresponds to a target search space in search spaces that are currently being monitored, the target search space being a search space with a shortest or longest monitoring slot periodicity in all search spaces that are currently being monitored, where the CORESETs that are configured on the activated BWP are CORESETs other than a CORESET in which the PDCCH is transmitted.

Optionally, by reading the program in the memory 920, the processor 900 is further configured to perform the following:

receiving a PDCCH by applying different QCL assumptions in different monitoring occasions.

Optionally, the QCL assumption is determined in at least one of the following manners:

using at least one TCI state corresponding to a CORESET in which the PDCCH indicated by the network device is located;

using a TCI state corresponding to a CORESET other than a CORESET in which the PDCCH is located;

using a mapping between monitoring occasions and TCI state identifiers IDs;

using a mapping between monitoring occasions and CORESET IDs;

using a mapping between monitoring occasions and CSI-RS resource indexes; or using a mapping between monitoring occasions and SSB resource indexes.

Optionally, information transmitted in a PDCCH is used to indicate at least one of the following:

whether the terminal needs to perform PDCCH monitoring during a target discontinuous reception DRX cycle, where the duration of the target DRX cycle is duration of a current DRX cycle, or duration of consecutive Q DRX cycles after current time, where Q is a positive integer;

that the terminal performs bandwidth part BWP switching;

that the terminal activates or deactivates an object, where the object is at least one of a cell, a cell group, a carrier, or a carrier group;

that the terminal stops PDCCH monitoring in a preset period of time;

that the terminal performs receive antenna switching;

a slot structure for the terminal;

that the terminal triggers reporting of channel state information CSI;

that the terminal triggers transmitting of a sounding reference signal SRS;

that the terminal receives a tracking reference signal TRS;

that the terminal receives a CSI-RS;

a physical downlink shared channel PDSCH time-domain resource allocation configuration for the terminal;

that the terminal performs at least one of beam management BM measurement, radio link monitoring RLM measurement, or radio resource management RRM measurement;

at least one of a total time of channel occupation time COT, a remaining time of COT, or channel access priority of the terminal in a new radio unlicensed band NR-U;

a power control parameter for uplink physical channel transmission by the terminal and/or a power control parameter for uplink physical signal transmission by the terminal;

that the terminal activates a different DRX configuration or downlink control channel search space configuration; or a maximum number of layers for PDSCH reception by the terminal.

In the terminal in this embodiment of this disclosure, a physical downlink control channel PDCCH search space configured by a network device is obtained, where the PDCCH search space indicates at least one monitoring occasion for monitoring a PDCCH; and PDCCH monitoring is performed in the at least one monitoring occasion. In the embodiments of this disclosure, flexibility of PDCCH transmission by the network device can be ensured, and furthermore, the terminal can perform monitoring at least once in the PDCCH search space, thereby effectively ensuring the reception performance of the terminal in receiving the PDCCH.

Figure 10:
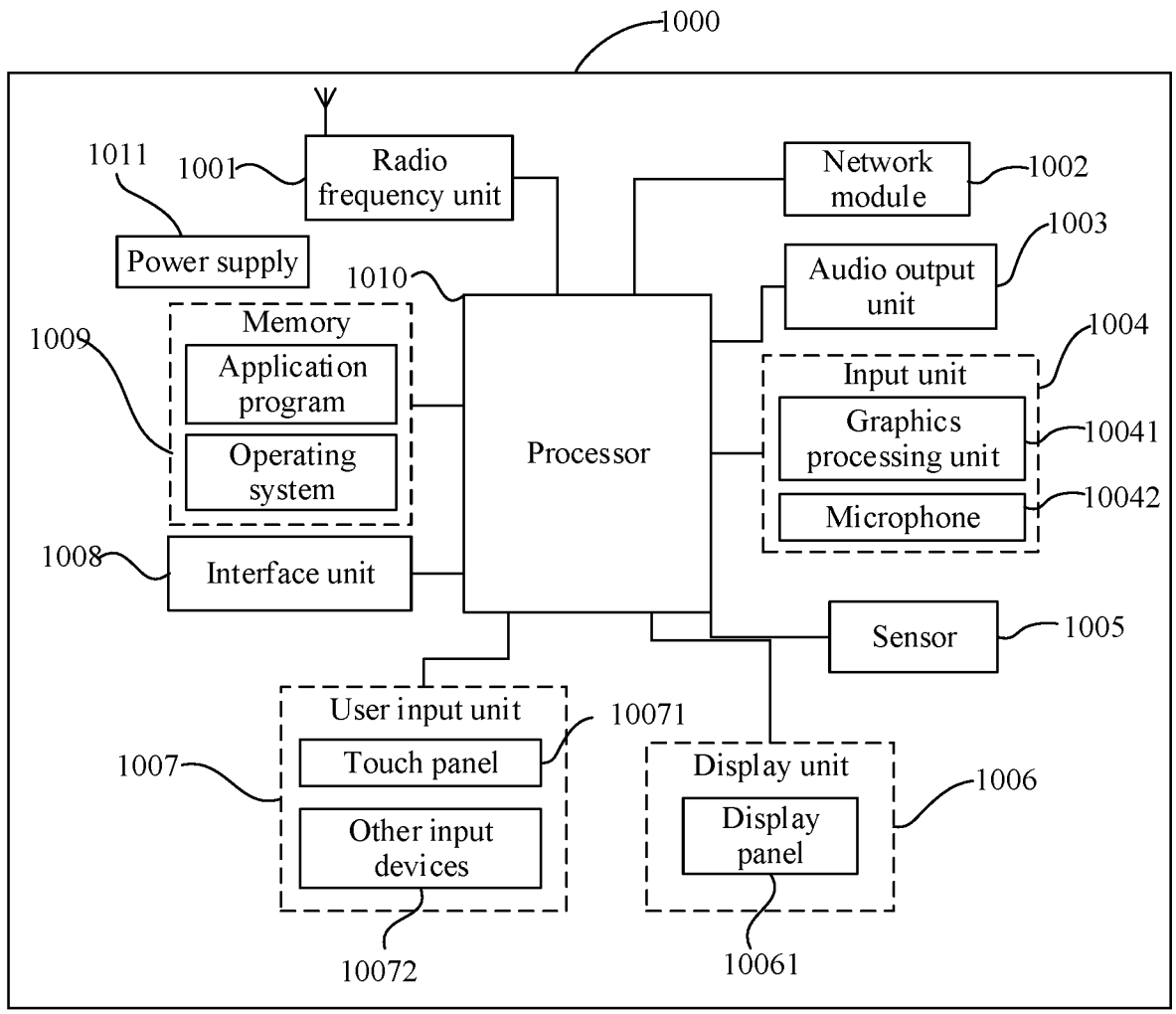
FIG. 10 is a second structural block diagram of a terminal according to an embodiment of this disclosure.

FIG. 10 is a schematic diagram of a hardware structure of a terminal for implementing the embodiments of this disclosure. The terminal 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, a processor 1010, and a power supply 1011. A person skilled in the art may understand that the terminal is not limited to the terminal structure shown in FIG. 10. The terminal may include more or fewer components than those shown in the figure, or combine some of the components, or arrange the components differently. In this embodiment of this disclosure, the terminal includes but is not limited to a mobile phone, a tablet computer, a notebook computer, a palmtop computer, an in-vehicle terminal, a wearable device, a pedometer, or the like.

The processor 1010 is configured to obtain a physical downlink control channel PDCCH search space configured by a network device, where the PDCCH search space indicates at least one monitoring occasion for monitoring a PDCCH; and perform PDCCH monitoring in the at least one monitoring occasion.

In the technical solutions of the embodiments of this disclosure, a physical downlink control channel PDCCH search space configured by a network device is obtained, where the PDCCH search space indicates at least one monitoring occasion for monitoring a PDCCH; and PDCCH monitoring is performed in the at least one monitoring occasion. In the embodiments of this disclosure, flexibility of PDCCH transmission by the network device can be ensured, and furthermore, the terminal can perform monitoring at least once in the PDCCH search space, thereby effectively ensuring the reception performance of the terminal in receiving the PDCCH.

It should be understood that in this embodiment of this disclosure, the radio frequency unit 1001 may be configured to receive and transmit signals in an information reception or transmission or call process. Specifically, after receiving downlink data from a network device, the radio frequency unit 1001 transmits the downlink data to the processor 1010 for processing, and in addition, transmits uplink data to the network device. Generally, the radio frequency unit 1001 includes but is not limited to an antenna, at least one amplifier, a transceiver, a coupler, a low noise amplifier, a duplexer, and the like. In addition, the radio frequency unit 1001 may also communicate with a network and other devices via a wireless communications system.

The terminal provides wireless broadband internet access for a user by using the network module 1002, for example, helps the user send and receive e-mails, browse web pages, and access streaming media.

The audio output unit 1003 may convert audio data received by the radio frequency unit 1001 or the network module 1002 or stored in the memory 1009 into an audio signal, and output the audio signal as a sound. In addition, the audio output unit 1003 may further provide audio output (for example, a call signal reception tone or a message reception tone) that is related to a specific function performed by the terminal 1000. The audio output unit 1003 includes a speaker, a buzzer, a phone receiver, and the like.

The input unit 1004 is configured to receive an audio signal or a video signal. The input unit 1004 may include a graphics processing unit (GPU) 10041 and a microphone 10042, and the graphics processing unit 10041 processes image data of a still picture or a video obtained by an image capture apparatus (for example, a camera) in an image capture mode or a video capture mode. A processed image frame may be displayed on the display unit 1006. The image frame processed by the graphics processing unit 10041 may be stored in the memory 1009 (or another storage medium) or be transmitted by the radio frequency unit 1001 or the network module 1002. The microphone 10042 can receive a sound and can process the sound into audio data. The processed audio data may be converted in a telephone call mode into a format that can be transmitted to a mobile communications network device through the radio frequency unit 1001, for outputting.

The terminal 1000 further includes at least one sensor 1005, for example, an optical sensor, a motion sensor, and another sensor. Specifically, the optical sensor may include an ambient light sensor and a proximity sensor. The ambient light sensor may adjust luminance of the display panel 10061 based on brightness of ambient light, and the proximity sensor may turn off a display panel 10061 and/or backlight when the terminal 1000 moves close to an ear. As a type of motion sensor, an accelerometer sensor can detect magnitudes of accelerations in all directions (usually three axes), can detect a magnitude and a direction of gravity when being static, and can be applied to terminal posture recognition (such as screen switching between portrait and landscape, related games, and magnetometer posture calibration), functions related to vibration recognition (such as a pedometer and tapping), and the like. The sensor 1005 may also include a fingerprint sensor, a pressure sensor, an iris sensor, a molecular sensor, a gyroscope, a barometer, a hygrometer, a thermometer, an infrared sensor, and the like. Details are not described herein.

The display unit 1006 is configured to display information input by the user or information provided for the user. The display unit 1006 may include the display panel 10061. The display panel 10061 may be configured in a form of a liquid crystal display (LCD), an organic light-emitting diode (OLED), or the like.

The user input unit 1007 may be configured to receive input digit or character information, and generate key signal input that is related to user setting and function control of the terminal. Specifically, the user input unit 1007 includes a touch panel 10071 and other input devices 10072. The touch panel 10071, also referred to as a touchscreen, may capture a touch operation performed by a user on or near the touch panel (for example, an operation performed by the user on the touch panel 10071 or near the touch panel 10071 by using a finger or any appropriate object or accessory such as a stylus). The touch panel 10071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into touch point coordinates, transmits the touch point coordinates to the processor 1010, and receives and executes a command transmitted by the processor 1010. In addition, the touch panel 10071 may be implemented in a plurality of forms, for example, as a resistive, capacitive, infrared, or surface acoustic wave touch panel. The user input unit 1007 may further include the other input devices 10072 in addition to the touch panel 10071. Specifically, the other input devices 10072 may include but are not limited to a physical keyboard, a function key (for example, a volume control key or a power on/off key), a trackball, a mouse, a joystick, and the like. Details are not described herein.

Further, the touch panel 10071 may cover the display panel 10061. After detecting a touch operation on or near the touch panel 10071, the touch panel 10071 transmits the touch operation to the processor 1010 to determine a type of a touch event. Then the processor 1010 provides corresponding visual output on the display panel 10061 based on the type of the touch event. Although the touch panel 10071 and the display panel 10061 are used as two independent components to implement input and output functions of the terminal in FIG. 10, the touch panel 10071 and the display panel 10061 may be integrated to implement the input and output functions of the terminal in some embodiments. This is not specifically limited herein.

The interface unit 1008 is an interface for connecting an external apparatus to the terminal 1000. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 1008 may be configured to receive input (for example, data information and electric power) from the external apparatus, and transmit the received input to one or more elements in the terminal 1000; or may be configured to transmit data between the terminal 1000 and the external apparatus.

The memory 1009 may be configured to store software programs and various data. The memory 1009 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 1009 may include a high-speed random access memory, or may further include a nonvolatile memory, for example, at least one magnetic disk storage device or a flash memory device, or another volatile solid-state storage device.

The processor 1010 is a control center of the terminal, and is connected to all components of the terminal by using various interfaces and lines. By running or executing a software program and/or a module stored in the memory 1009 and invoking data stored in the memory 1009, the processor 1010 executes various functions of the terminal and processes data, so as to perform overall monitoring on the terminal. The processor 1010 may include one or more processing units. Optionally, the processor 1010 may integrate an application processor and a modem processor. The application processor mainly processes an operating system, a user interface, an application program, and the like. The modem processor mainly processes wireless communication. It may be understood that the modem processor may alternatively not be integrated in the processor 1010.

The terminal 1000 may further include a power supply 1011 (for example, a battery) that supplies power to each component. Optionally, the power supply 1011 may be logically connected to the processor 1010 by using a power management system, so as to implement functions such as charging management, discharging management, and power consumption management by using the power management system.

In addition, the terminal 1000 includes some functional modules that are not shown. Details are not described herein.

Figure 11:
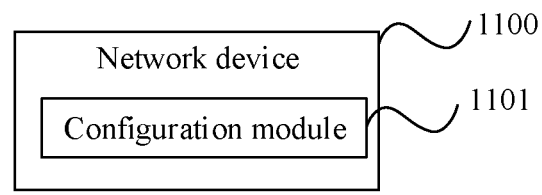
FIG. 11 is a schematic modular diagram of a network device according to an embodiment of this disclosure.

As shown in FIG. 11, an embodiment of this disclosure further provides a network device 1100, including:

a configuration module 1101, configured to configure a physical downlink control channel PDCCH search space, where the PDCCH search space indicates at least one monitoring occasion for monitoring a PDCCH.

The network device in this embodiment of this disclosure further includes:

a first indication module, configured to: after the configuration module has configured the physical downlink control channel PDCCH search space, indicate, to a terminal, a valid monitoring occasion, where the valid monitoring occasion is a monitoring occasion in which the terminal performs PDCCH monitoring.

The network device in this embodiment of this disclosure further includes:

a second indication module, configured to: after the configuration module has configured the physical downlink control channel PDCCH search space, indicate, to a terminal, the number of PDCCH candidates corresponding to each monitoring aggregation level.

The network device in this embodiment of this disclosure further includes:

a third indication module, configured to: after the configuration module has configured the physical downlink control channel PDCCH search space, indicate, to a terminal, time locations of N PDCCH candidates for PDCCH monitoring in the at least one monitoring occasion, where N is a positive integer.

In the network device in this embodiment of this disclosure, a physical downlink control channel PDCCH search space is configured, where the PDCCH search space indicates at least one monitoring occasion for monitoring a PDCCH, so that the terminal performs monitoring at least once in the PDCCH search space, thereby effectively ensuring the reception performance of the terminal in receiving the PDCCH, and flexibility of PDCCH transmission by the network device can be ensured.

An embodiment of this disclosure further provides a network device, including a memory, a processor, and a computer program stored in the memory and capable of running on the processor, where when the computer program is executed by the processor, the processes in the foregoing channel monitoring method embodiment applied to the network device are implemented, with the same technical effects achieved. To avoid repetition, details are not described again herein.

An embodiment of this disclosure further provides a computer-readable storage medium, where a computer program is stored in the computer-readable storage medium, and when the computer program is executed by a processor, the processes in the foregoing channel monitoring method embodiment applied to the network device are implemented, with the same technical effects achieved. To avoid repetition, details are not described again herein. For example, the computer-readable storage medium is a read-only memory (ROM), a random access memory (RAM), a magnetic disk, or an optical disk.

Figure 12:
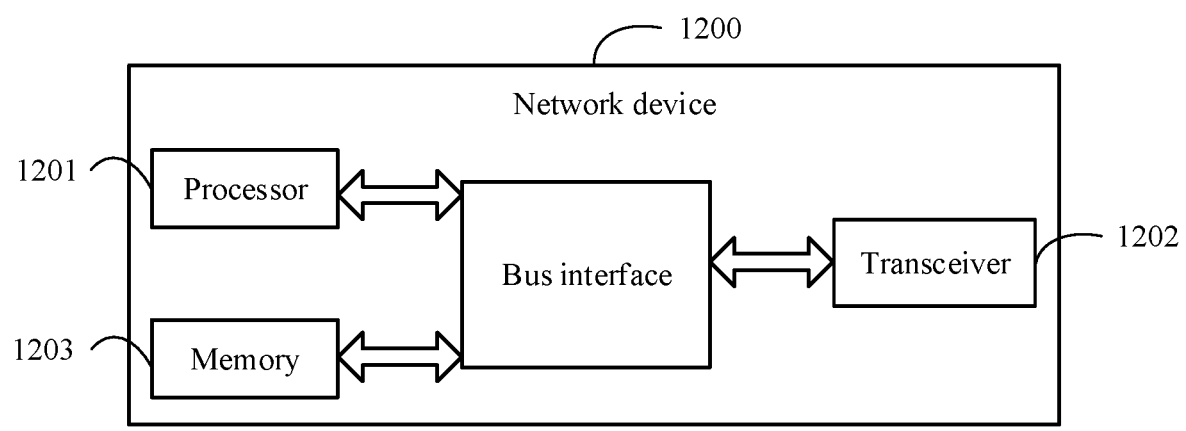
FIG. 12 is a structural block diagram of a network device according to an embodiment of this disclosure.

As shown in FIG. 12, an embodiment of this disclosure further provides a network device 1200, including a processor 1201, a transceiver 1202, a memory 1203, and a bus interface, where the processor 1201 is configured to read the program in the memory 1203 to perform the following process:

configuring a physical downlink control channel PDCCH search space, where the PDCCH search space indicates at least one monitoring occasion for monitoring a PDCCH.

In FIG. 12, a bus architecture may include any quantity of interconnected buses and bridges, and specifically connect together various circuits of one or more processors represented by the processor 1201 and a memory represented by the memory 1203. The bus architecture may further interconnect various other circuits such as a peripheral device, a voltage regulator, and a power management circuit. These are all well known in the art, and therefore are not further described in this specification. The bus interface provides interfaces. The transceiver 1202 may be a plurality of components, including a transmitter and a receiver, and provides units for communicating with a variety of other apparatuses on a transmission medium.

Optionally, by reading the program in the memory 1203, the processor 1201 is further configured to perform the following:

indicating, to a terminal, a valid monitoring occasion, where the valid monitoring occasion is a monitoring occasion in which the terminal performs PDCCH monitoring.

Optionally, by reading the program in the memory 1203, the processor 1201 is further configured to perform the following:

indicating, to a terminal, the number of PDCCH candidates corresponding to each monitoring aggregation level.

Optionally, by reading the program in the memory 1203, the processor 1201 is further configured to perform the following:

indicating, to a terminal, time locations of N PDCCH candidates for PDCCH monitoring in the at least one monitoring occasion, where N is a positive integer.

In the network device in this embodiment of this disclosure, a physical downlink control channel PDCCH search space is configured, where the PDCCH search space indicates at least one monitoring occasion for monitoring a PDCCH, so that the terminal performs monitoring at least once in the PDCCH search space, thereby effectively ensuring the reception performance of the terminal in receiving the PDCCH, and flexibility of PDCCH transmission by the network device can be ensured.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A channel monitoring method, applied to a terminal and comprising:
obtaining a physical downlink control channel (PDCCH) search space configured by a network device, wherein the PDCCH search space indicates at least one monitoring occasion for monitoring a PDCCH; and
performing PDCCH monitoring in the at least one monitoring occasion;
wherein the performing the PDCCH monitoring in the at least one monitoring occasion comprises:
performing the PDCCH monitoring in a valid monitoring occasion of the at least one monitoring occasion;
wherein the valid monitoring occasion is located in an orthogonal frequency division multiplexing (OFDM) symbol other than an uplink symbol and flexible symbol indicated by downlink control information (DCI), and the valid monitoring occasion is one monitoring occasion starting at a monitoring start time or multiple consecutive monitoring occasions starting at the monitoring start time;

wherein the valid monitoring occasion further meets at least one of the following criteria:
the valid monitoring occasion is located in an OFDM symbol other than an OFDM symbol for synchronization signal block (SSB) measurement or channel state information-reference signal (CSI-RS) measurement; or
the valid monitoring occasion is located in an OFDM symbol abutting an OFDM symbol for SSB measurement or abutting an OFDM symbol for CSI-RS measurement.

2. The channel monitoring method according to claim 1, wherein the valid monitoring occasion is indicated by the network device;
or in a case that there are at least two valid monitoring occasions, the at least two valid monitoring occasions are consecutive monitoring occasions in the PDCCH search space.

3. The channel monitoring method according to claim 1, wherein the performing PDCCH monitoring in the at least one monitoring occasion comprises:
receiving a PDCCH by applying a same quasi co-location (QCL) assumption on the at least one monitoring occasion.

4. The channel monitoring method according to claim 3, wherein the QCL assumption is determined in at least one of the following manners:
using a QCL assumption of control resource set CORESET0;
using a QCL assumption with a same activated transmission configuration indication (TCI) state as CORESET0;
using an SSB or CSI-RS selected in a latest random access procedure;
using an activated TCI state corresponding to a CORESET with the smallest or largest index in CORESETs that are configured on an activated bandwidth part (BWP);
using an activated TCI state corresponding to a CORESET indicated by a network in CORESETs that are configured on an activated BWP; or
using an activated TCI state corresponding to a CORESET that corresponds to a target search space in search spaces that are currently being monitored, the target search space being a search space with a shortest or longest monitoring slot periodicity in all search spaces that are currently being monitored, wherein
the CORESETs that are configured on the activated BWP are CORESETs other than a CORESET in which the PDCCH is transmitted.

5. The channel monitoring method according to claim 1, wherein the performing PDCCH monitoring in the at least one monitoring occasion comprises:
receiving a PDCCH by applying different QCL assumptions in different monitoring occasions.

6. The channel monitoring method according to claim 5, wherein the QCL assumption is determined in at least one of the following manners:
using at least one TCI state corresponding to a CORESET in which the PDCCH indicated by the network device is located;
using a TCI state corresponding to a CORESET other than a CORESET in which the PDCCH is located;
using a mapping between monitoring occasions and TCI state identifiers (IDs);
using a mapping between monitoring occasions and CORESET IDS;

using a mapping between monitoring occasions and CSI-RS resource indexes; or using a mapping between monitoring occasions and SSB resource indexes.

7. The channel monitoring method according to claim 1, wherein information transmitted in the PDCCH is used to indicate at least one of the following:

whether the terminal needs to perform PDCCH monitoring during a target discontinuous reception (DRX) cycle, wherein duration of the target DRX cycle is duration of a current DRX cycle, or duration of consecutive Q DRX cycles after current time, wherein Q is a positive integer;

that the terminal performs bandwidth part (BWP) switching;

that the terminal activates or deactivates an object, wherein the object is at least one of a cell, a cell group, a carrier, or a carrier group;

that the terminal stops PDCCH monitoring in a preset period of time;

that the terminal performs receive antenna switching;

a slot structure for the terminal;

that the terminal triggers reporting of channel state information (CSI);

that the terminal triggers transmitting of a sounding reference signal (SRS);

that the terminal receives a tracking reference signal (TRS);

that the terminal receives a CSI-RS;

a physical downlink shared channel (PDSCH) time-domain resource allocation configuration for the terminal;

that the terminal performs at least one of beam management (BM) measurement, radio link monitoring (RLM) measurement, or radio resource management (RRM) measurement;

at least one of a total time of channel occupation time (COT), a remaining time of COT, or channel access priority of the terminal in a new radio unlicensed band (NR-U);

a power control parameter for uplink physical channel transmission by the terminal and/or a power control parameter for uplink physical signal transmission by the terminal;

that the terminal activates a different DRX configuration or downlink control channel search space configuration; or a maximum number of layers for PDSCH reception by the terminal.

8. A non-transitory computer-readable storage medium, wherein a computer program is stored in the non-transitory computer-readable storage medium, and when the computer program is executed by a processor, the steps of the channel monitoring method according to claim 1 are implemented.

9. A terminal, comprising a memory, a processor, and a computer program stored in the memory and capable of running on the processor, wherein when the computer program is executed by the processor, a channel monitoring method is implemented, and the method comprises:

obtaining a physical downlink control channel (PDCCH) search space configured by a network device, wherein the PDCCH search space indicates at least one monitoring occasion for monitoring a PDCCH; and performing PDCCH monitoring in the at least one monitoring occasion;

wherein the performing the PDCCH monitoring in the at least one monitoring occasion comprises:

performing the PDCCH monitoring in a valid monitoring occasion of the at least one monitoring occasion;

wherein the valid monitoring occasion is located in an orthogonal frequency division multiplexing (OFDM) symbol other than an uplink symbol and flexible symbol indicated by downlink control information (DCI), and the valid monitoring occasion is one monitoring occasion starting at a monitoring start time or multiple consecutive monitoring occasions starting at the monitoring start time;

wherein the valid monitoring occasion further meets at least one of the following criteria:

the valid monitoring occasion is located in an OFDM symbol other than an OFDM symbol for synchronization signal block (SSB) measurement or channel state information-reference signal (CSI-RS) measurement; or the valid monitoring occasion is located in an OFDM symbol abutting an OFDM symbol for SSB measurement or abutting an OFDM symbol for CSI-RS measurement.

10. The terminal according to claim 9, wherein the valid monitoring occasion is indicated by the network device;

or in a case that there are at least two valid monitoring occasions, the at least two valid monitoring occasions are consecutive monitoring occasions in the PDCCH search space.

11. The terminal according to claim 9, wherein the performing PDCCH monitoring in the at least one monitoring occasion comprises:

receiving a PDCCH by applying a same quasi co-location (QCL) assumption on the at least one monitoring occasion.

12. The terminal according to claim 11, wherein the QCL assumption is determined in at least one of the following manners:

using a QCL assumption of control resource set CORESET0;

using a QCL assumption with a same activated transmission configuration indication (TCI) state as CORESET0;

using an SSB or CSI-RS selected in a latest random access procedure;

using an activated TCI state corresponding to a CORESET with the smallest or largest index in CORESETs that are configured on an activated bandwidth part (BWP);

using an activated TCI state corresponding to a CORESET indicated by a network in CORESETs that are configured on an activated BWP; or using an activated TCI state corresponding to a CORESET that corresponds to a target search space in search spaces that are currently being monitored, the target search space being a search space with a shortest or longest monitoring slot periodicity in all search spaces that are currently being monitored, wherein the CORESETs that are configured on the activated BWP are CORESETs other than a CORESET in which the PDCCH is transmitted.

13. The terminal according to claim 9, wherein the performing PDCCH monitoring in the at least one monitoring occasion comprises:

receiving a PDCCH by applying different QCL assumptions in different monitoring occasions.

14. The terminal according to claim 13, wherein the QCL assumption is determined in at least one of the following manners:

using at least one TCI state corresponding to a CORESET in which the PDCCH indicated by the network device is located;

using a TCI state corresponding to a CORESET other than a CORESET in which the PDCCH is located;

using a mapping between monitoring occasions and TCI state identifiers (IDs);

using a mapping between monitoring occasions and CORESET IDS;

using a mapping between monitoring occasions and CSI-RS resource indexes; or using a mapping between monitoring occasions and SSB resource indexes.

15. The terminal according to claim 9, wherein information transmitted in the PDCCH is used to indicate at least one of the following:

whether the terminal needs to perform PDCCH monitoring during a target discontinuous reception (DRX) cycle, wherein duration of the target DRX cycle is duration of a current DRX cycle, or duration of consecutive Q DRX cycles after current time, wherein Q is a positive integer;

that the terminal performs bandwidth part (BWP) switching;

that the terminal activates or deactivates an object, wherein the object is at least one of a cell, a cell group, a carrier, or a carrier group;

that the terminal stops PDCCH monitoring in a preset period of time;

that the terminal performs receive antenna switching;

a slot structure for the terminal;

that the terminal triggers reporting of channel state information (CSI);

that the terminal triggers transmitting of a sounding reference signal (SRS);

that the terminal receives a tracking reference signal (TRS);

that the terminal receives a CSI-RS;

a physical downlink shared channel (PDSCH) time-domain resource allocation configuration for the terminal;

that the terminal performs at least one of beam management (BM) measurement, radio link monitoring (RLM) measurement, or radio resource management (RRM) measurement;

at least one of a total time of channel occupation time (COT), a remaining time of COT, or channel access priority of the terminal in a new radio unlicensed band (NR-U);

a power control parameter for uplink physical channel transmission by the terminal and/or a power control parameter for uplink physical signal transmission by the terminal;

that the terminal activates a different DRX configuration or downlink control channel search space configuration; or a maximum number of layers for PDSCH reception by the terminal.

16. A network device, comprising a memory, a processor, and a computer program stored in the memory and capable of running on the processor, wherein when the computer program is executed by the processor, a channel monitoring method is implemented, and the method comprises:

configuring a physical downlink control channel (PDCCH) search space, wherein the PDCCH search space indicates at least one monitoring occasion for monitoring a PDCCH;

wherein after the configuring the physical downlink control channel (PDCCH) search space, the method further comprises:

indicating, to a terminal, a valid monitoring occasion, wherein the valid monitoring occasion is a monitoring occasion in which the terminal performs PDCCH monitoring;

wherein the valid monitoring occasion is located in an orthogonal frequency division multiplexing (OFDM) symbol other than an uplink symbol and flexible symbol indicated by downlink control information (DCI), and the valid monitoring occasion is one monitoring occasion starting at a monitoring start time or multiple consecutive monitoring occasions starting at the monitoring start time;

wherein the valid monitoring occasion further meets at least one of the following criteria:

the valid monitoring occasion is located in an OFDM symbol other than an OFDM symbol for synchronization signal block (SSB) measurement or channel state information-reference signal (CSI-RS) measurement; or the valid monitoring occasion is located in an OFDM symbol abutting an OFDM symbol for SSB measurement or abutting an OFDM symbol for CSI-RS measurement.

* * * * *